US005980675A

United States Patent [19]

Tsuchihashi et al.

[11] Patent Number: 5,980,675

[45] Date of Patent: Nov. 9, 1999

[54] PROCESS FOR THE MANUFACTURE OF HONEYCOMB CORE STRUCTURES

[75] Inventors: Toshifumi Tsuchihashi; Toshiyuki Nishida, both of Hiratsuka, Japan

[73] Assignee: The Yokohama Rubber Co., Ltd., Tokyo, Japan

[21] Appl. No.: 08/859,351

[22] Filed: May 20, 1997

Related U.S. Application Data

[63] Continuation of application No. 08/533,940, Sep. 26, 1995, abandoned.

[30] Foreign Application Priority Data

Oct. 4, 1994 [JP] Japan .................................... 6-240203

[51] Int. Cl.$^{6}$ .............................. B32B 3/12; B32B 31/18

[52] U.S. Cl. .......................... 156/197; 156/199; 156/257; 156/259; 156/264; 156/291

[58] Field of Search .................................... 156/197, 259, 156/221, 199, 257, 264, 291

[56] References Cited

U.S. PATENT DOCUMENTS

| | | | |
|---|---|---|---|
| 2,983,640 | 5/1961 | Knoll et al. | 156/197 |
| 3,301,729 | 1/1967 | Kauffman | 156/197 |
| 3,519,510 | 7/1970 | Ardolino et al. | 156/197 |
| 3,655,476 | 4/1972 | Siegal | 156/197 |
| 3,772,112 | 11/1973 | Lyons et al. | 156/271 |
| 4,948,445 | 8/1990 | Hees | 156/197 |
| 4,981,744 | 1/1991 | Swank | 156/197 |
| 5,277,732 | 1/1994 | Meier | 156/197 |

FOREIGN PATENT DOCUMENTS

| | | |
|---|---|---|
| 51-23548 | 7/1976 | Japan . |
| 52-20950 | 6/1977 | Japan . |
| 53-133276 | 11/1978 | Japan . |
| 53-134074 | 11/1978 | Japan . |
| 53-134076 | 11/1978 | Japan . |

*Primary Examiner*—Richard Crispino
*Attorney, Agent, or Firm*—Finnegan, Henderson, Farabow, Garrett & Dunner, L.L.P.

[57] ABSTRACT

A process for the manufacture of honeycomb core structure is disclosed, which substantially comprises the step (a) of of feeding a starting continuous web or sheet of material; the step (b) of applying an adhesive to the sheet material along a plurality of spaced parallel bands; the step (c) of drying the sheet; the step (d) of forming a plurality of slits extending longitudinally of the sheet and interconnected by a transversely extending slit-devoid web portion; the step (e) of cutting the slitted sheet to a predetermined dimension across the slit-devoid web portion; the step (f) of piling a plurality of layers of the thus cut sheets upon one another in a stack with the adhesive bands on one of the adjacent sheets positioned out of registry with those on the other by half of a pitch between the consecutive bands on each sheet; the step (g) of compressively curing the stacked sheets; the step (h) of slicing the cured stack into individual elongated strips; and the step (i) of expanding the strips in a direction normal to the plane of the stack. The step (d) is carried into practice by a slit-forming means capable of forming spaced parallel slits longitudinally of the continuous web simultaneously with a transversely extending slit-devoid blank portion at predetermined intervals, thus providing the web with alternate slitted and slit-free regions.

3 Claims, 3 Drawing Sheets

PROCESS FOR THE MANUFACTURE OF HONEYCOMB CORE STRUCTURES

This application is a continuation of application Ser. No. 08/533,940, filed Sep. 26, 1995, now abandoned.

BACKGROUND OF THE INVENTION

1. Field of the Invention

This invention relates to a process for the manufacture of cellular or honeycomb core structures from web materials such as steel, aluminum, paper or like sheets.

2. Prior Art

There are known various processes for making honeycomb core structures which find wide application in air-craft construction and in the manufacture of furnitures, buildings, structural elements and the like. A typical example of such known process comprises the steps of applying spaced parallel lines or bands of an adhesive to one or more continuous webs of material, cutting the webs into individual sheets or strips of a predetermined length and width, superimposing the sheets upon one another in a stack with the adhesive bands staggered with respect to those on the immediately preceding and succeeding sheets by a distance equal to half of the distance or pitch between the consecutive adhesive bands on each sheet, compressively curing the stacked sheets, cutting the cured sheets into unexpanded cue block lengths, and finally expanding the blocks into cellular structure products, as disclosed for example in Japanese Patent Publications 51-23548 and 52-20950. These prior art processes have a drawback in that they are both time-consuming as the stacking and cutting operations are separately performed and costly due to considerable material losses arising from cutting the webs into individual strips of a width corresponding to the thickness of a resultant honeycomb product.

Japanese Patent Publications 53-133276, 53-134074 and 53-134076 disclose processes which are substantially analogous to but advantageous over the aforementioned prior art in that both cutting and stacking the sheet materials are performed in a continuous mode of operation, hence with improved productivity. However, such known processes have still much to be desired in respect of speed in cutting and stacking the sheet materials and furthermore involve rather complicated equipment arrangements.

SUMMARY OF THE INVENTION

With the foregoing drawbacks of the prior art in view, the present invention seeks to provide an improved process which enables the manufacture of honeycomb core structures at a maximum rate of efficiency with material losses held to an absolute minimum.

The process according to the invention comprises the steps of feeding a starting continuous web or sheet of material; applying an adhesive to the sheet material along a plurality of spaced parallel bands; drying the sheet; forming a plurality of slits extending longitudinally of the sheet and interconnected by a transversely extending slit-devoid web portion; cutting the slitted sheet to a predetermined dimension across the slit-devoid web portion; piling a plurality of layers of the thus cut sheets upon one another in a stack with the adhesive bands on one of the adjacent sheets positioned out of registry with those on the other by half of a pitch between the consecutive bands on each sheet; compressively curing the stacked sheets; slicing the cured stack into individual elongated strips; and expanding the strips in a direction normal to the plane of the stack.

The invention will be better understood from the following description taken in connection with the accompanying drawings which illustrate by way of example a preferred embodiment of the invention.

DETAILED DESCRIPTION OF THE INVENTION

Figure 5:
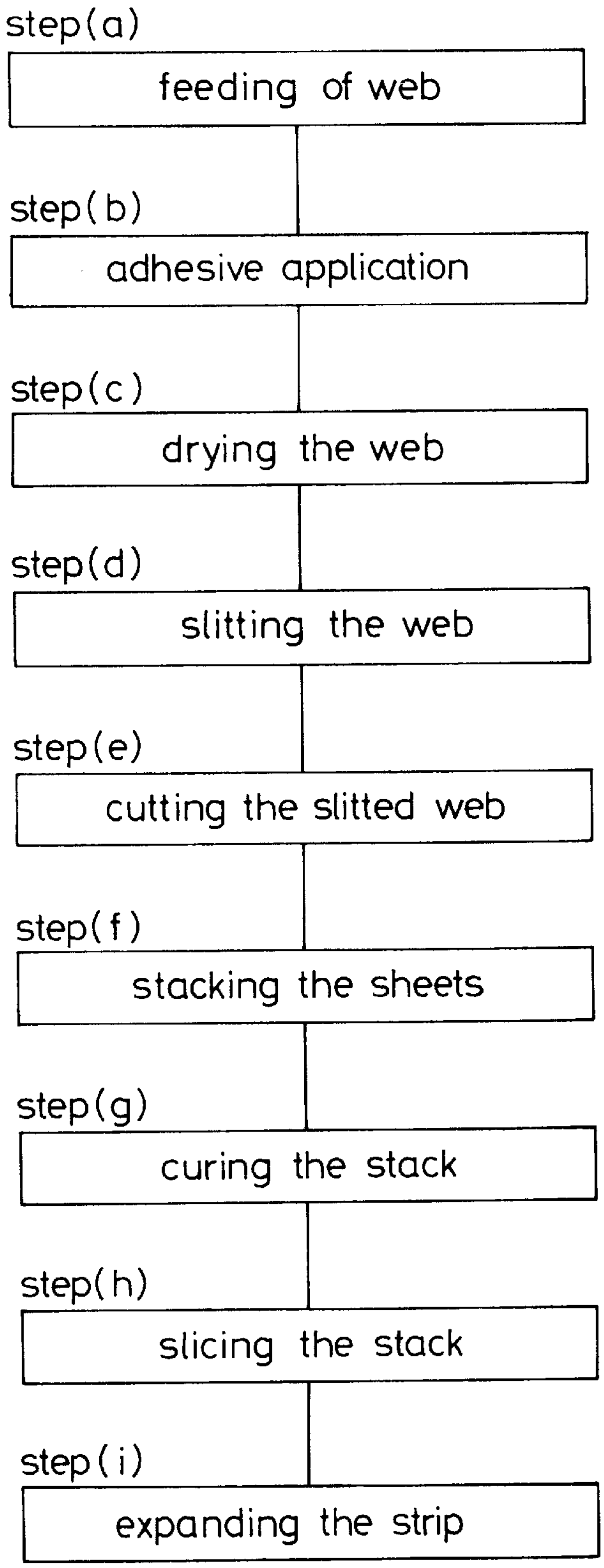
FIG. 5 is a process flow diagram schematically illustrating a preferred embodiment of the inventive process.

Referring first to FIG. 5 of the accompanying drawings, there is shown a process flow diagram explaining the various steps involved in the process of the invention for manufacturing a honeycomb core structure. The process of the invention comprises the step (a) of feeding a starting continuous web or sheet of material; the step (b) of applying an adhesive to the sheet material along a plurality of spaced parallel bands; the step (c) of drying the sheet; the step (d) of forming a plurality of slits extending longitudinally of the sheet and interconnected by a transversely extending slit-devoid web portion; the step (e) of cutting the slitted sheet to a predetermined dimension across the slit-devoid web portion; the step (f) of piling a plurality of layers of the thus cut sheets upon one another in a stack with the adhesive bands on one of the adjacent sheets positioned out of registry with those on the other by half of a pitch between the consecutive bands on each sheet; the step (g) of compressively curing the stacked sheets; the step (h) of slicing the cured stack into individual elongated strips; and the step (i) of expanding the strips in a direction normal to the plane of the stack.

Figure 1:
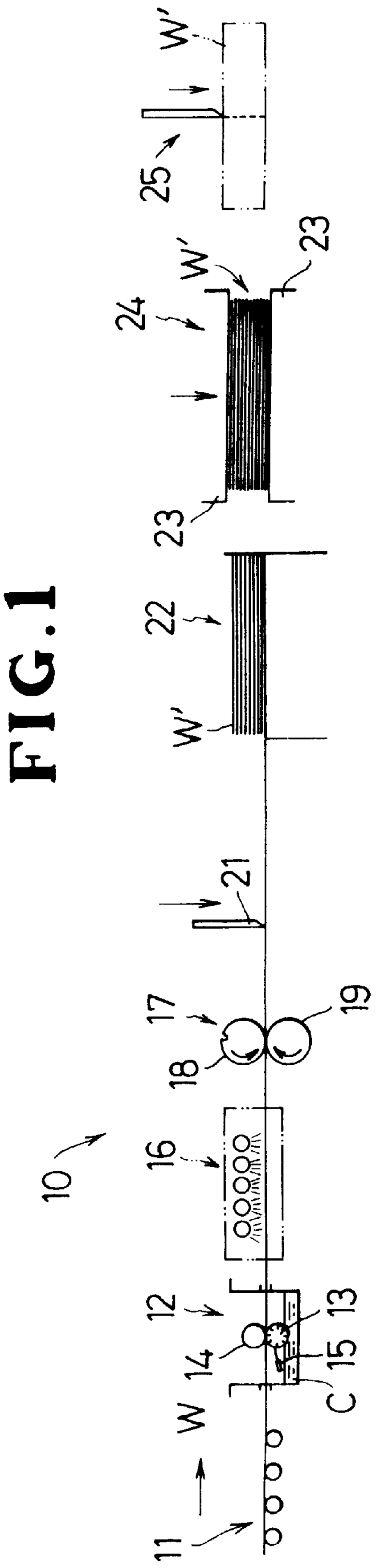
FIG. 1 is a diagrammatic view schematically illustrating the arrangement of an apparatus employed to carry the process of the invention into practice.

A preferred form of apparatus employed to implement the invention is illustrated in FIG. 1 in which the various operating machine components are arranged in a sequence conforming with the corresponding steps (a)–(i) of the aforesaid process, it being understood that the apparatus does not per se constitute part of the invention and is therefore shown diagrammatically for the purpose of more conveniently explaining the process of the invention.

A web of material W such as for example steel, aluminum or paper is fed continuously unidirectionally in the direction of the horizontal arrow through feeding means 11 in the apparatus 10, the feeding means 11 being suitably in the form of a roller conveyor. The web of material W is coated with an adhesive compound C by an applicator 12 comprising a gravure roll 13, a nip roll 14 and a doctor blade 15, the arrangement being commonly known as a gravure coater capable of applying a controlled amount of adhesive at predetermined or equal intervals along the width of the web and preferably forming at this stage a plurality of spaced parallel adhesive bands disposed in staggered relationship to one another or distributed such that the bands are spaced apart by half a distance or pitch between the immediately preceding and succeeding ones.

Figure 2:
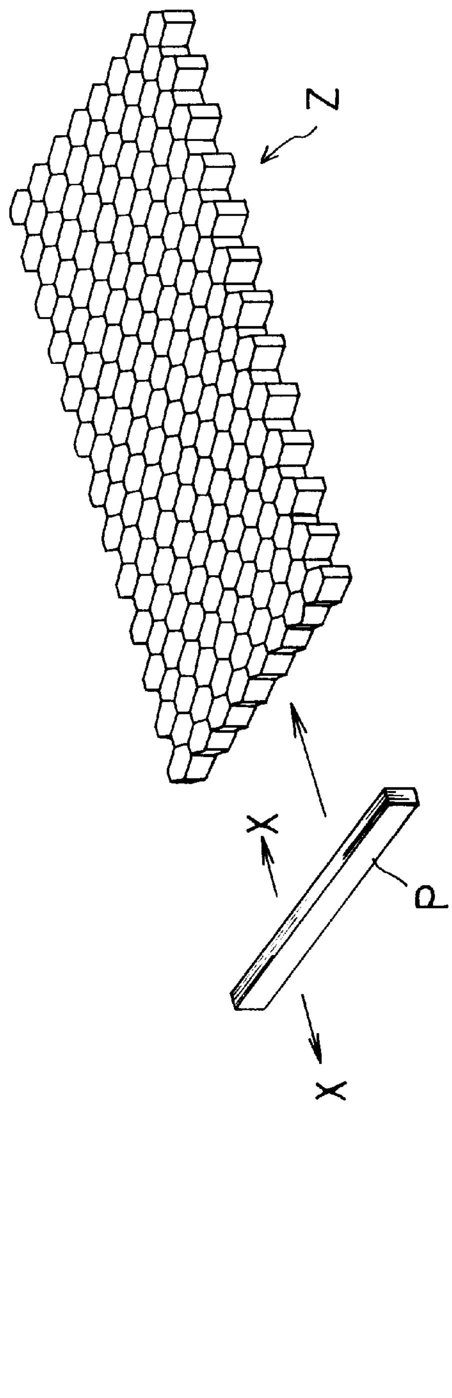
FIG. 2 is a diagrammatic perspective view of a honeycomb core structure formed in accordance with the process of the invention.
Figure 3:
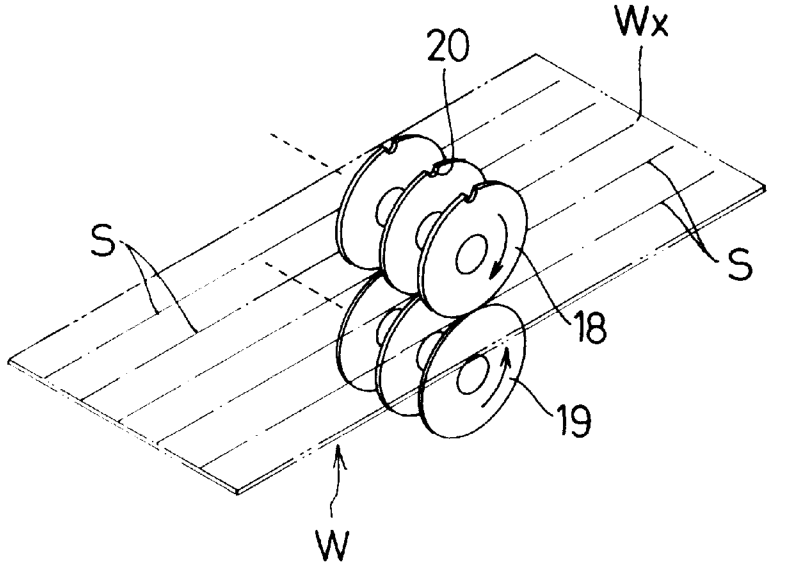
FIG. 3 is a diagrammatic perspective view of means for slitting a web material according to the invention.
Figure 4:
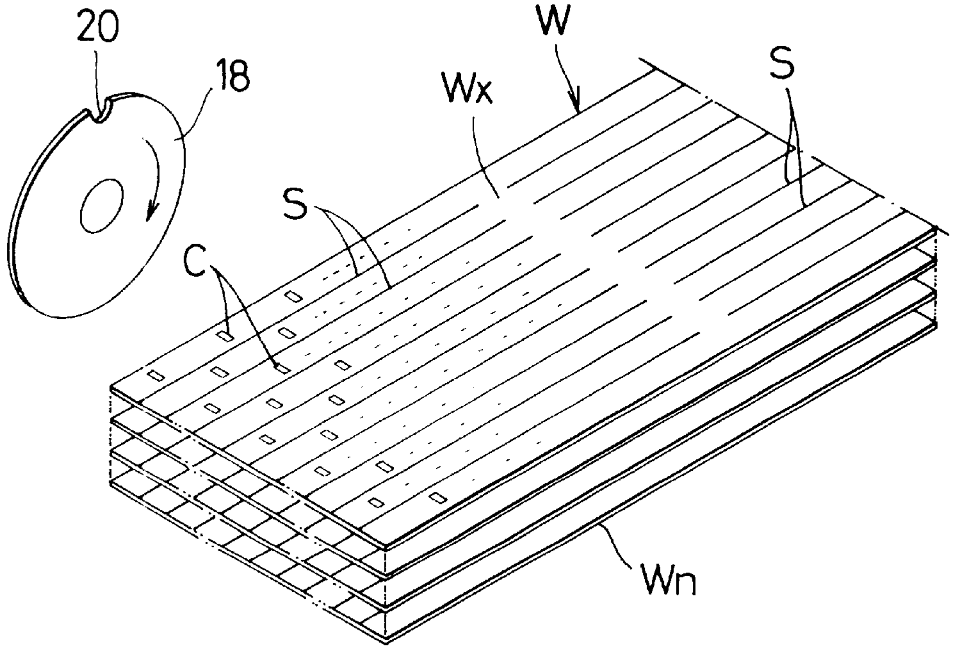
FIG. 4 is a perspective view of a stack of sheets of material with a transverse slit-devoid web portion formed according to the invention.

The web of material W is then dried on passage through a drier 16 and thereafter introduced into means 17 for forming spaced parallel longitudinal slits in the continuous web W. The slit-forming means 17 comprises a plurality of spaced pairs of coacting circular bladed rolls 18 and 19 rotatably coaxially mounted on a shaft (not shown) extending transversely of the continuous web W. Upon passage through the nip between the paired blades 18 and 19, the web W receives spaced parallel longitudinal lines of cuts or slits S as shown in FIG. 3. One of the bladed rolls 18 and 19 in each pair is provided circumferentially with a blade-free notch or recess 20 having a predetermined circumferential length such that the continuous web W upon moving past the slitter 17 is left with a transversely extending unslitted or slit-devoid portion Wx of a width corresponding to the length of the notch 20. For purposes of illustration, the bladed rolls 18 and 19 each may be about 100 mm–300 mm in diameter and about 3 mm thick, although these dimensions are variable with a particular honeycomb product specification to be chosen. The distance between adjacent pairs of slitters 17 may be adjusted depending upon a desired thickness of the resultant honeycomb product. The slit-forming means or slitter 17 thus provides the continuous web W with longitudinal slits S spaced apart by a distance corresponding to the width of each individual strip P (FIG. 2) into which the web W is sliced in the step (h) as later described, while leaving transverse slit-devoid web portions Wx at predetermined equal intervals along a continuous length of web material.

The thus slitted web W is cut transversely across the slit-devoid portions Wx by a cutting means 21 into individual sheets W'. As many sheets as desired are then piled one upon another at a stacking station 22, with the adhesive bands C on one of the adjacent sheets W' positioned out of registry with respect to those on the other by half a pitch between the consecutive bands on each sheet.

The sheets W' that have been stacked to a predetermined height are compressed with heat between a pair of plate members 23, 23 at a curing station 24 so that the piled sheets W' are firmly bonded together through the areas of adhesive bands C. The stack of sheets W' after being cooled to cure is sliced by a slicing blade 25 along a transverse line closely adjacent to each of the opposite boundaries of the slit-devoid blank web portion Wx in each sheet so that the stack can be separated into individual elongated strips P. Each such separated strip P is finally expanded in a well known manner by pulling it out in the direction of the arrows X, the thus expanded strip being shown in FIG. 2 for purposes of illustration to be of a hexagonal cellular configuration Z.

The invention may be otherwise embodied than specifically described herein without departing from the scope of the appended claims. As for an examples means for forming a plurality of spaced parallel slits S prior to piling the sheets of material in a stack may be in the form of a molding device.

What is claimed is:

1. A process for the manufacture of honeycomb core structures consisting essentially of the steps of continuously feeding a starting continuous sheet of material to an adhesive applicator;

applying to said sheet an amount of adhesive at intervals along the width of the sheet to form a plurality of spaced parallel adhesive bands; drying the applied adhesive; thereafter forming a plurality of parallel spaced apart slits extending longitudinally along the sheet, said slits being longitudinally spaced along the length of the sheet and interconnected by slit-devoid sheet portions extending transversely across the sheet and spaced at predetermined intervals along the continuous length of the sheet; cutting the resulting slitted sheet to a predetermined dimension across the slit-devoid sheet portions to provide cut sheets having at least one of said slit-devoid portions interconnected said longitudinally spaced slits; piling a plurality of layers of the thus cut sheets upon one another in a stack with said adhesive bands on adjacent sheets being positioned out of registry with one another by half of a pitch between consecutive parallel bands on each cut sheet; compressively curing the adhesive on the stacked sheets to form a cured stack; slicing the cured stack across the width thereof along one or more lines extending transversely across the slit-devoid portions to form individual elongated strips; and expanding said strips in a direction normal to the plane of the stacking.

2. A process according to claim 1 wherein the step of applying an adhesive to the sheet is carried out by means of a gravure coater which forms spaced parallel adhesive bands staggered relative to one another by half a distance or pitch between the immediately preceding and succeeding ones.

3. A process according to claim 1 wherein the step of forming a plurality of slits in the sheet is carried out by a slit-forming means comprising a plurality of spaced pairs of coacting bladed rolls, one roll in each pair being provided circumferentially with a notch to leave slit-devoid blank sheet portions at predetermined intervals on the continuous sheet.

* * * * *